United States Patent
Takeda et al.

(10) Patent No.: US 9,543,554 B2
(45) Date of Patent: Jan. 10, 2017

(54) BATTERY DEVICE THAT HOLDS BATTERIES

(71) Applicants: TOYODA GOSEI CO., LTD., Kiyosu-shi, Aichi-ken (JP); KYOHO MACHINE WORKS, LTD., Toyota-shi, Aichi-ken (JP)

(72) Inventors: Shinichi Takeda, Kiyosu (JP); Jin Kasuya, Kiyosu (JP); Yoshiaki Kameda, Kiyosu (JP); Kosuke Kusaba, Kiyosu (JP); Masanori Kodera, Toyota (JP); Yukihiro Isogai, Toyota (JP); Kazuhiro Noro, Toyota (JP); Nobuyoshi Fujiwara, Toyota (JP)

(73) Assignees: TOYODA GOSEI CO., LTD., Aichi-pref. (JP); KYOHO MACHINE WORKS, LTD., Toyota-shi (JP)

( * ) Notice: Subject to any disclaimer, the term of this patent is extended or adjusted under 35 U.S.C. 154(b) by 307 days.

(21) Appl. No.: 14/208,468

(22) Filed: Mar. 13, 2014

(65) Prior Publication Data
US 2014/0287288 A1    Sep. 25, 2014

(30) Foreign Application Priority Data
Mar. 22, 2013  (JP) .................................. 2013-59318

(51) Int. Cl.
*H01M 2/10*    (2006.01)

(52) U.S. Cl.
CPC ........... *H01M 2/105* (2013.01); *H01M 2/1077* (2013.01)

(58) Field of Classification Search
CPC .......................... H01M 2/105; H01M 2/1077
See application file for complete search history.

(56) References Cited

FOREIGN PATENT DOCUMENTS

| CN | 102856518 A | 1/2013 | |
|---|---|---|---|
| JP | H11-67170 A | 3/1999 | |
| JP | 2010-9798 | * 1/2010 | ............. Y02E 60/12 |
| JP | 2010-009798 A | 1/2010 | |
| JP | 2012-028244 A | 2/2012 | |

* cited by examiner

*Primary Examiner* — Raymond Alejandro
(74) *Attorney, Agent, or Firm* — Posz Law Group, PLC

(57) ABSTRACT

A battery holder includes restriction members protruded from a holding base plate in an axial direction of batteries to be located in spaces between the batteries. Each of the restriction members has: a tapered surface which is inclined to the axial direction and is in line contact with an outer periphery of the end face of the battery when the restriction member is inserted into the space, so as to apply a force to move the battery in a radial direction of the battery; and a support surface which supports a side face of the battery that is not in contact with the tapered surface, by surface contact. The support surface receives a moving force in the radial direction from the tapered surface and supports the side face of the battery by a reactive force.

9 Claims, 7 Drawing Sheets

BATTERY DEVICE THAT HOLDS BATTERIES

CROSS-REFERENCE TO RELATED APPLICATION

The present application claims the priority based on Japanese Patent Application No. 2013-59318 filed on Mar. 22, 2013, the disclosure of which is hereby incorporated by reference in its entirety.

BACKGROUND

1. Technical Field

The present invention relates to a battery device.

2. Related Art

A known configuration of a battery device having a battery holder to hold a plurality of batteries fills a potting resin between batteries for modularization (see JP 2012-28244A). Another known technique attaches elastic deformable members made of an elastic material to a frame body and holds edges of batteries by the elastic deformable members (see JP 2010-9798A).

The battery holder according to the disclosure of JP 2012-28244A, however, has problems that the operation of filling a resin between batteries is troublesome and reduces the productivity. In the battery holder according to the disclosure of JP 2010-9798A, on the other hand, a variation in dimension of the batteries and dimensions of the respective elastic deformable members affect other elastic deformable members via the batteries. This may apply a large force to part of the batteries and cause deformation or may fail to provide a sufficient force for holding part of the batteries.

SUMMARY

According to one aspect of the invention, there is provided a battery device configured to hold a plurality of batteries. The battery device comprises: a holding base plate located parallel to end faces of the plurality of batteries; and a plurality of restriction members protruded from the holding base plate in an axial direction of the batteries to be located in spaces between the batteries. Each of the plurality of restriction members comprises: a tapered surface which is inclined to the axial direction and is in line contact with an outer periphery of the end face of the battery when the restriction member is located in the space, so as to apply a force to move the battery in a radial direction of the battery; and a support surface which supports a side face of the battery that is not in contact with the tapered surface, by surface contact. The support surface is configured to receive a moving force in the radial direction from the tapered surface and support the side face of the battery by a reactive force.

When being inserted in the axial direction into the space between the batteries, the restriction member receives, on its tapered surface, a reactive force from an edge of the battery and presses and supports the side face of the battery by surface contact with the support surface by this reactive force. The respective support surfaces are formed to have surface contact, so that the batteries are positioned in the axial direction by the support surfaces as reference planes. The intervals between the respective batteries are specified to be fixed by the restriction members, so that passages which a cooling medium flows through are arranged at fixed intervals. This arrangement enables the cooling medium to evenly flow between the batteries and efficiently cool down the batteries. This reduces a variation in temperature of the batteries and equalizes the temperatures of the plurality of batteries, thus preventing part of the batteries from having short battery life and extending the entire battery life.

(2) In the above aspect, the support surface may have an elastic member provided on a surface that is in contact with the battery. The elastic member may be made of a material having a greater displacement than a displacement of the tapered surface when being pressed by the battery.

(3) In the above aspect, the side face of the battery may be in a cylindrical shape. The tapered surface may be a curved surface that is in contact with part of the outer periphery of the end face of the battery. The support surface may be a curved surface that is in contact with part of the side face of the battery.

(4) In the above aspect, the plurality of batteries may be arranged such that a shape of connecting centers of end faces of three batteries located closest, to one another forms an equilateral triangle. The restriction member may be configured to be located at center of the equilateral triangle.

(5) in the above aspect, the battery device may further comprise a support member configured to support another end face of the battery opposite to one end face of the battery. The support member may be made of a material having elasticity.

(6) In the above aspect, the restriction members may be located respectively on one end face of the battery and another end face of the battery that is opposite to the one end face. Tapered surfaces and support surfaces of the restriction members located on both the one end face and the other end face may be respectively arranged on identical sides in the axial direction.

(7) In the above aspect, the tapered surface of the restriction member on the other end face may be made of a material having a greater displacement than a displacement of the support. surface of the restriction member on the other end face, when being pressed by the battery.

(8) in the above aspect, the battery device may further comprise a middle support plate arranged across a predetermined distance from the restriction member in the axial direction to come into contact with and support the side face of the battery.

(9) In the above aspect, the middle support plate may have a through hole, which the battery passes through and which may be configured such that the side face of the battery is in contact with an inner wall of the through hole.

DETAILED DESCRIPTION

A. First Embodiment (1) Configuration of Battery Device

Figure 1:
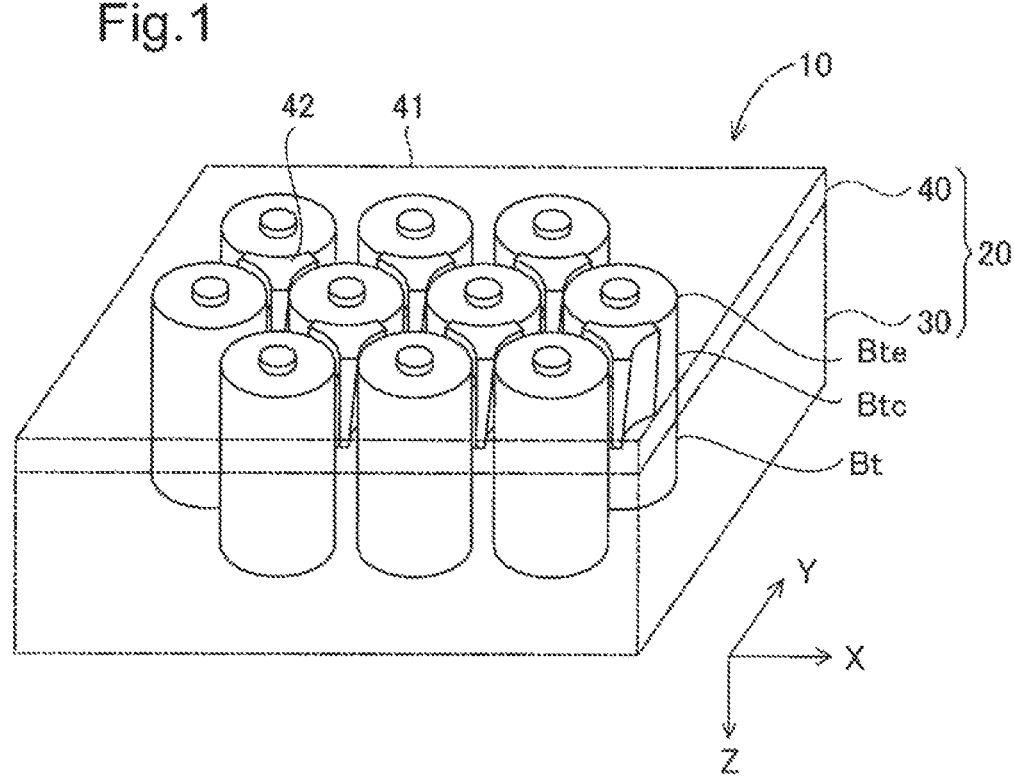
FIG. 1 is a perspective view illustrating a battery device having a plurality of batteries held by a battery holder according to a first embodiment of the invention.
Figure 2:
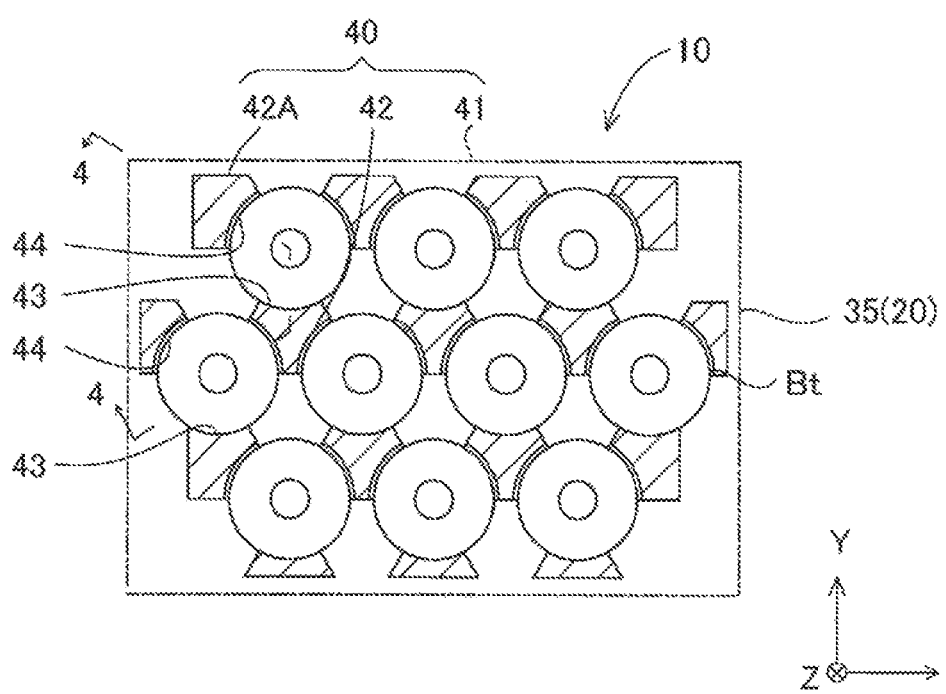
FIG. 2 is a plan view of the battery device.

FIG. 1 is a perspective view illustrating a battery device 10 having a plurality of batteries Bt held by a battery holder 20 according to a first embodiment of the invention. FIG. 2 is a plan view of the battery device 10. The battery device 10 is configured as a mechanism to hold the plurality of batteries .Bt by the battery holder 20. The batteries Bt are cylindrical general-purpose batteries, and lithium ion batteries used as automobile power sources may be applied, to the batteries Bt. The battery Bt has a battery casing Btc in a cylindrical shape. A positive terminal and a negative terminal are respectively formed on end faces of the battery casing Btc.

XYZ axes orthogonal to one another are shown in FIG. 1. The X-axis direction is also called column direction of batteries. The Y-axis direction is a direction orthogonal to the column direction and is also called row direction of batteries. The Z-axis direction is a direction parallel to the side faces of the batteries and is also called axial direction of the batteries.

Figure 3:
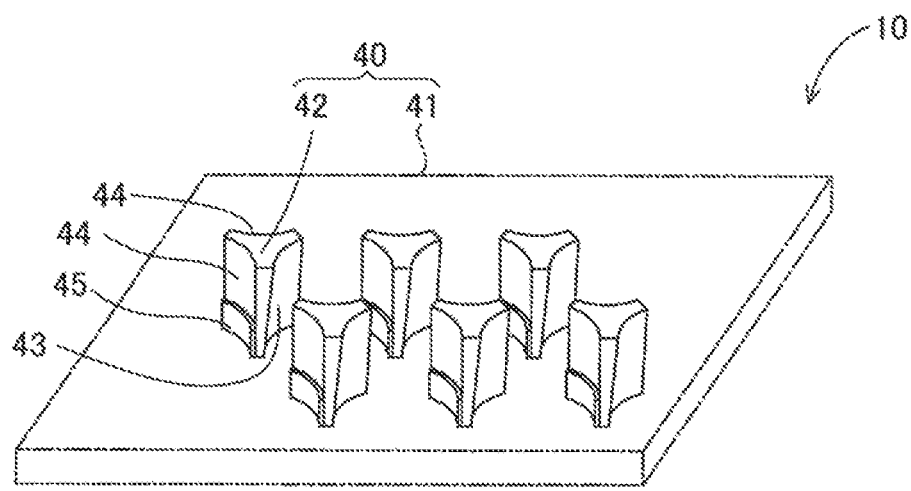
FIG. 3 is an exploded perspective view illustrating the battery device.
Figure 3:
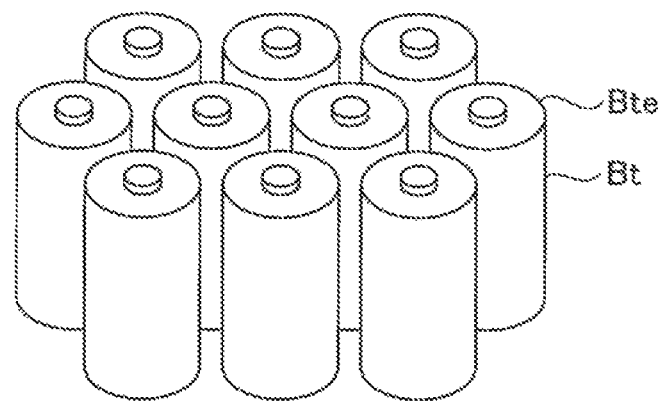
Figure 3:
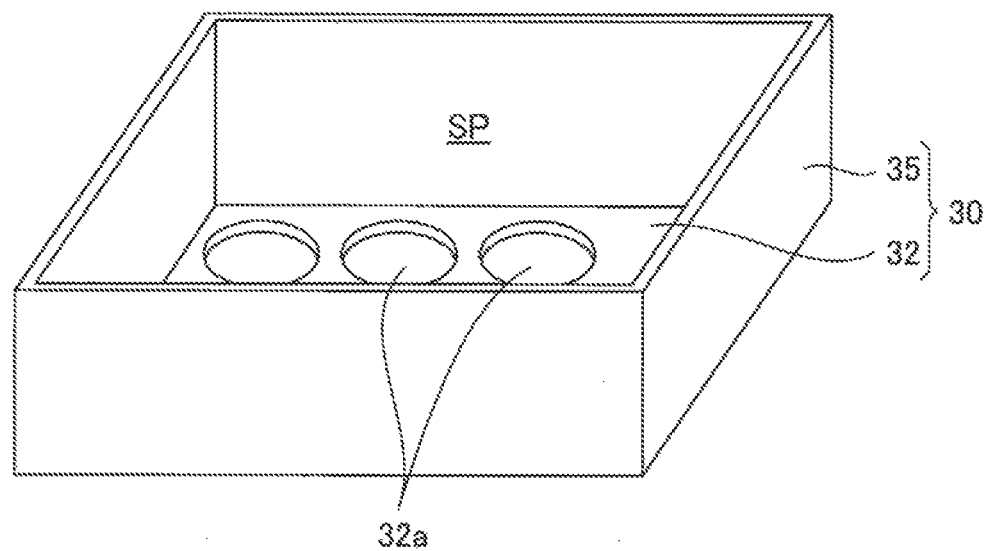

FIG. 3 is an exploded perspective view illustrating the battery device 10. The battery holder 20 includes a boxlike housing 30 and a holding member 40 arranged to close the upper opening of the housing 30. The battery holder 20 has a holding space SP formed by the housing 30 and the holding member 40 to receive the plurality of batteries BT therein. The housing 30 includes a bottom plate 32 and a side wall 35. Structures for supporting the lower parts of the batteries BT are formed in the bottom plate 32.

Figure 4:
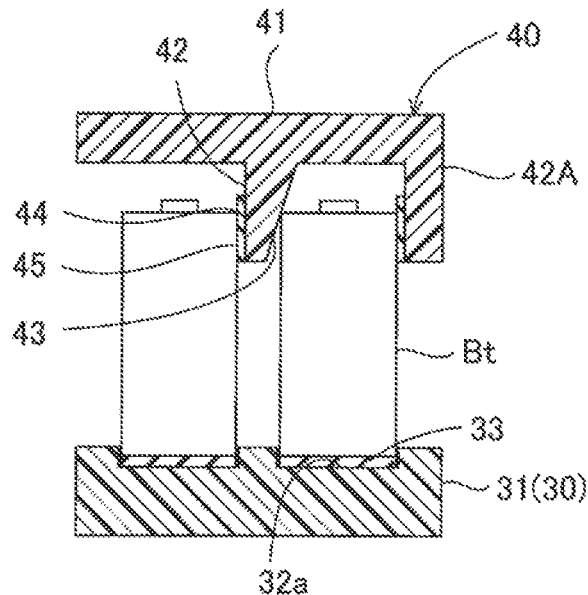
FIG. 4 is a cross sectional view, taken on line 4-4 in FIG. 2.

FIG. 4 is a cross sectional view, taken on line 4-4 in FIG. 2. The bottom plate 32 has support recesses 32a provided to support the lower parts of the batteries Bt. A support member 33 is placed on the bottom face of the support recess 32a. The support members 33 are members serving to absorb a variation of the batteries Bt in the height direction and hold the batteries Bt in the axial direction.

Figure 5:
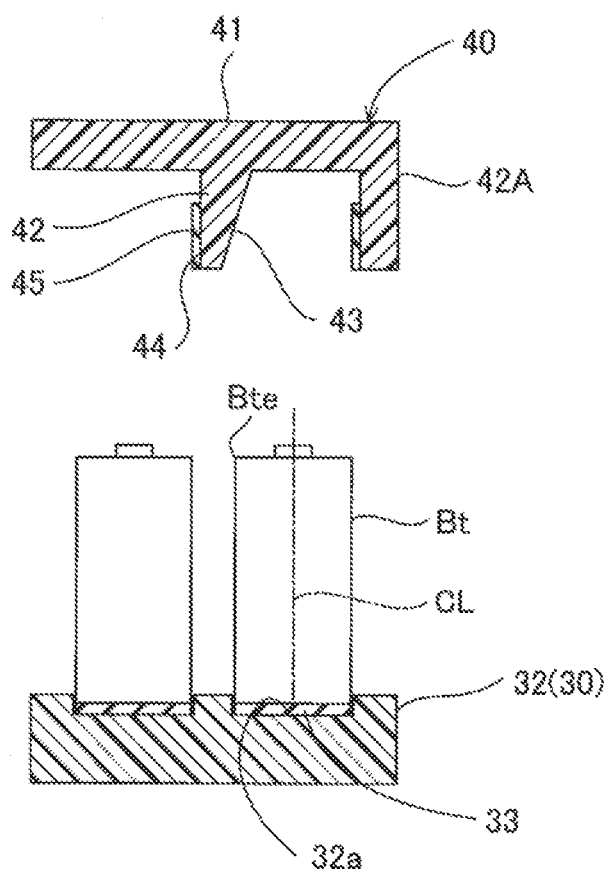
FIG. 5 is a cross sectional view illustrating a state prior to assembly of a holding member with a housing.

FIG. 5 is a cross sectional view illustrating a state prior to assembly of the holding member 40 with the housing 30. The holding member 40 includes a holding base plate 41 placed on a face parallel to the bottom plate 32, restriction members 42 and outside restriction members 42A protruded from the holding base plate 41 in the axial direction of the batteries Bt. A hard resin material such as polyphenylene sulfide (PPS) resin or a material including a metal base material coated with an insulating resin may be employed as the material for making the holding member 40.

As shown in FIGS. 3 and 5, the restriction members 42 are provided as projections to be inserted between the batteries Bt in the axial direction of the holding base plate 41. The restriction members 42 are in a shape surrounded by one tapered surface 43 and two support surfaces 44. The tapered surface 43 is a curved inclined surface which is inclined in a direction away from the central axis CL of the battery Bt with approaching an edge of the restriction member 42. The tapered surface 43 is formed to be in line contact with an edge Bte of the battery Bt. The support surfaces 44 are formed as curved surfaces to support the side face of the battery Bt or more specifically the side face of the battery Bt that is not in contact with the tapered surface 43, by surface contact. The restriction members 42 are provided as projections located adjacent to the inside of the side wall 35 to support the outer peripheries of the side faces of the batteries Bt. The restriction member 42A has one or two tapered surfaces or support surfaces 44C (FIG. 2).

Figure 10:
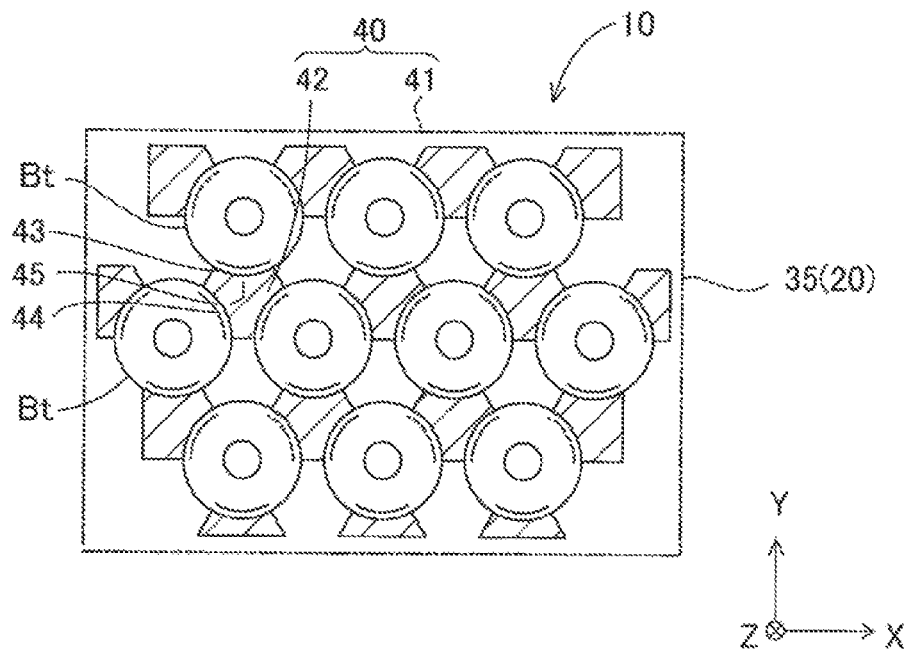
FIG. 10 is a diagram illustrating a state that batteries are held by a. battery holder according to the invention.

As shown in FIG. 2, the restriction members 42 and the restriction members 42A are arranged to support the batteries BT, such that the side face of the battery Bt is supported by one tapered surface 43 and two support surfaces 44. More specifically the tapered surfaces 43 are located at the positions shown by solid, line arcs, while the support surfaces 44 are located at the positions shown by broken line arcs (FIG. 10).

(2) Assembly Operation of Batteries Bt by Holding Member 40

Figure 6:
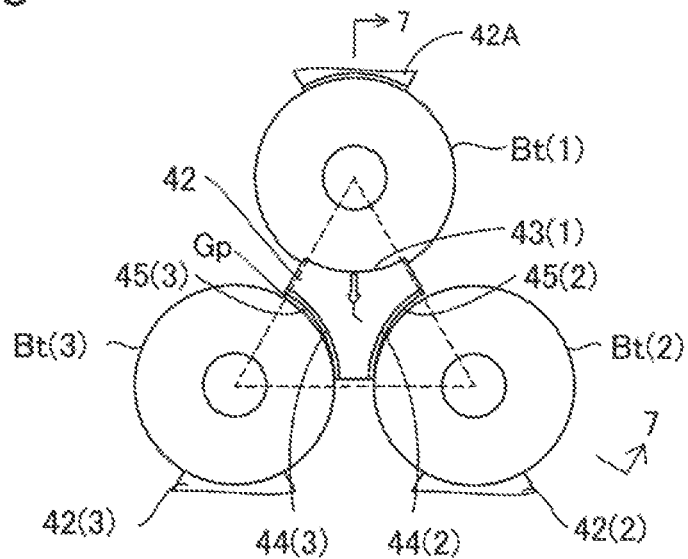
FIG. 6 is a diagram illustrating an operation to hold batteries by the battery holder.
Figure 7:
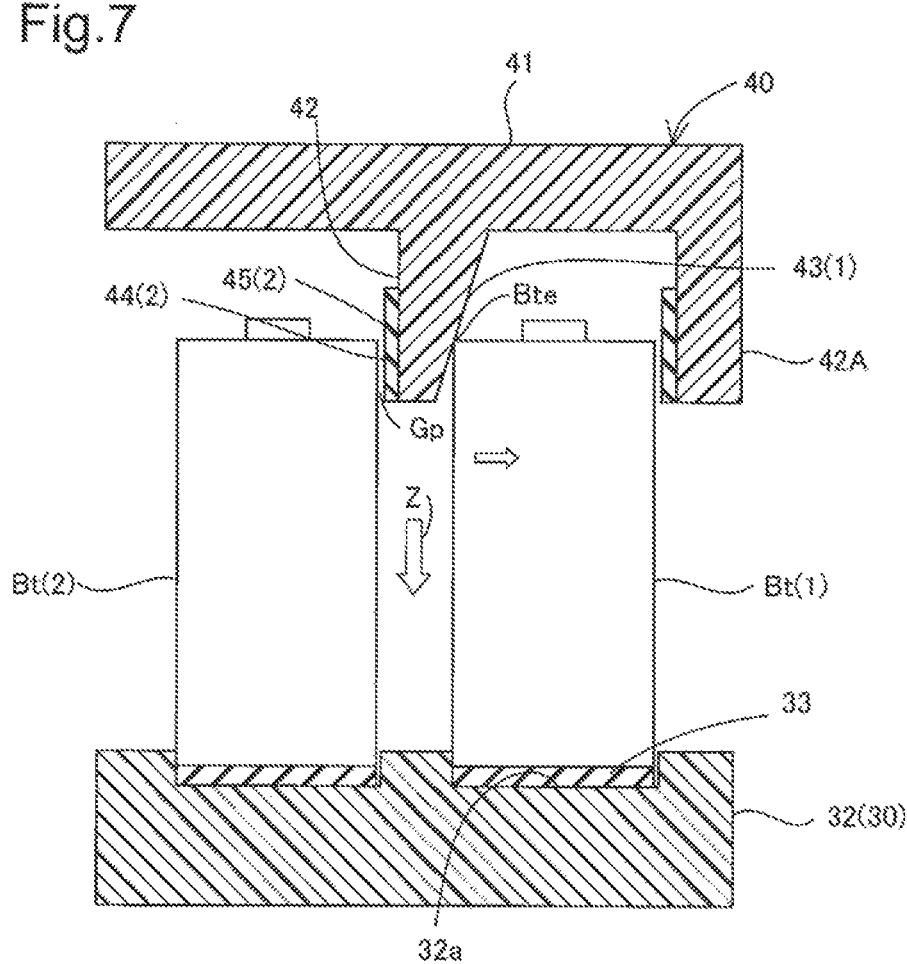
FIG. 7 is a cross sectional view, taken on line 7-7 in FIG. 6.
Figure 8:
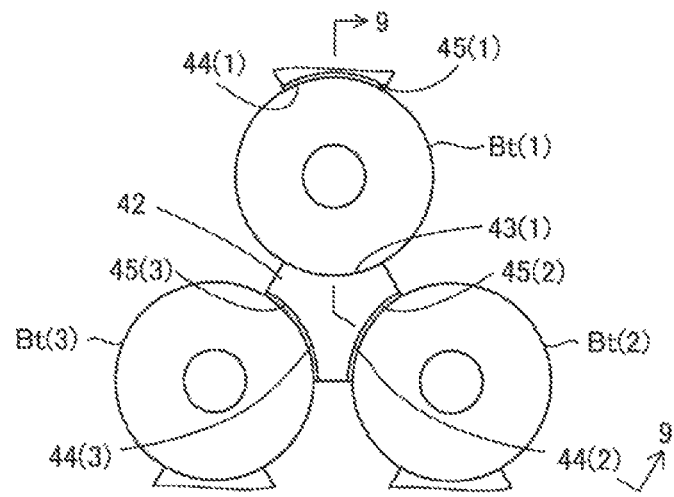
FIG. 8 is a diagram illustrating an operation subsequent to FIG. 6.

The following describes an assembly operation of the batteries Bt by the holding member 40. FIGS. 6 to 8 are diagrams illustrating an operation to hold the batteries Bt. FIG. 6 illustrates three batteries arranged in an equilateral triangle among the plurality of batteries. The restriction member 42 is located at the center of the equilateral triangle. FIG. 7 is a cross sectional view, taken on line 7-7 in FIG. 6. The three batteries Bt shown in FIG. 6 are expressed by batteries Bt(1), Bt(2) and Bt(3), and the suffixes attached to the other members correspond to these suffixes of the batteries Bt.

As shown in FIG. 7, the plurality of batteries Bt are respectively placed in the plurality of support recesses 32a in the housing 30. Subsequently as shown in FIGS. 6 and 7, the restriction member 42 of the holding member 40 is positioned in the vicinity of the center of the equilateral triangle formed by the three batteries Bt, and the holding member 40 is moved in the axial direction Z approaching the batteries Bt, so that the restriction member 42 is inserted into the space between the batteries Bt. As shown in FIG. 7, when the tapered surface 43(1) of the restriction member 42 comes into contact with the edge Bte of the battery Bt(1), the battery Bt(1) is slightly tilted by the pressing force and the reactive force between the battery Bt(1) and the restriction member 42.

Figure 9:
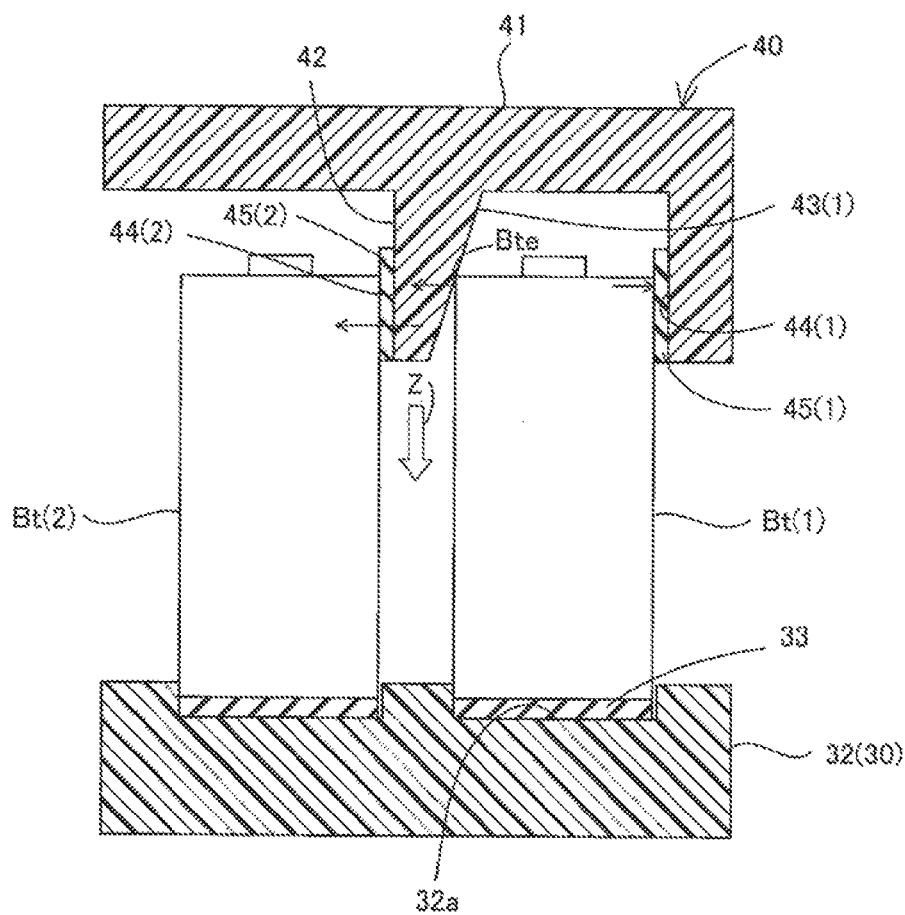
FIG. 9 is a cross sectional view, taken on line 9-9 in FIG. 8.

As shown in FIGS. 8 and 9, when the holding member 40 is additionally moved in the axial direction Z, the battery Bt(1) is moved, in the direction orthogonal to the axial direction by the tapered surface 43(1) of the restriction member 42. The motion of the battery Bt(1) is restricted via an elastic member 45(1) by the support surface 44(1) of the restriction member 42. In this state, the elastic member 45(1) absorbs variations of the cylindrical surface of the battery Bt(1) and the support surface 44(1). The restriction members 42 position the batteries Bt in this state. The support members 33 serve to absorb a variation of the batteries Bt in the axial direction. As shown in FIG. 10, the tapered surface 43 moves the battery Bt, while the support surfaces 44 restrict the motion of the battery Bt, so that the plurality of batteries Bt are positioned by the holding member 40 and are held by the battery holder 20. The solid lines drawn on the inner peripheries of the batteries Bt indicate the positions where the batteries Bt are pressed by the tapered surfaces 43, and the broken lines drawn on the inner peripheries of the batteries Bt indicate the positions where the batteries Bt are supported by the support surfaces 44 via the elastic members 45.

(3) Functions and Advantageous Effects of Embodiment

This embodiment has the following functions and advantageous effects.

(3)-1

As shown in FIGS. 8 and 9, when being inserted in the axial direction into the space between the batteries Bt, the restriction member 42 receives the reactive force on its tapered surface 43 from the edge Bte of the battery Bt and presses and supports the side face of the battery Bt by surface contact with the support surfaces 44 by this reactive force. The respective support surfaces 44 are formed parallel to the axial direction to have a fixed interval, so that the batteries Bt are positioned by the support surfaces 44 as reference planes.

(3)-2

As shown in FIG. 9. the elastic members 45 attached to the support surfaces 44 of the restriction member 42 are elastically deformed when coming into contact with the side face of the battery Bt. The elastic members 45 accordingly absorb a variation in outer diameter dimension of the batteries Bt. This enables the interval between the respective batteries Bt to be specified at certain intervals defined by the restriction members 42. The elastic members 45 also serve to protect the side face of the battery Bt from being damaged when the battery holder 20 hits against the side face of the battery Bt during assembly operation.

(3)-3

The intervals between the respective batteries Bt are specified to be fixed by the restriction members 42, so that passages which a cooling medium (the air) flows through are arranged at fixed intervals. This arrangement enables the cooling medium to evenly flow between the batteries Bt and efficiently cool down the batteries Bt. This reduces a variation in temperature of the batteries and equalizes the temperatures of the plurality of batteries, thus preventing part of the batteries from having short battery life and extending the entire battery life.

(3)-4

The tapered surface 43 is made of a relatively hard resin material, such as PPS, and transfers the force received from the edge Bte of the battery Bt to the support surfaces 44 without reduction, thus enabling the support surfaces 44 to effectively support the side face of the battery Bt. PPS employed for formation of the tapered surfaces 43 reduces a positional misalignment of the batteries associated with aged deterioration, compared with rubber.

(3)-5

The elastic members 45 do not come into contact with the side face of the battery Bt in the initial stage of the insertion operation of the restriction member 42 as shown in. FIG. 7, but come into contact with the side face of the battery Bt in the final stage of the insertion operation as shown in FIG. 9. Even when the elastic members 45 are made of a rubber material having a large coefficient of friction, this arrangement causes the elastic members 45 to rub against the side face of the battery Bt only by a short distance during the insertion operation and thereby reduces the force required for insertion of the restriction member 42.

(3)-6

The support members 33 placed in the support recesses 32a of the housing 30 as shown in FIG. 4 are made of an elastic material such as rubber. The support members 33 accordingly absorb a variation of the batteries Bt in the height direction and accurately position the batteries Bt in the axial direction.

B. Second Embodiment

Figure 11:
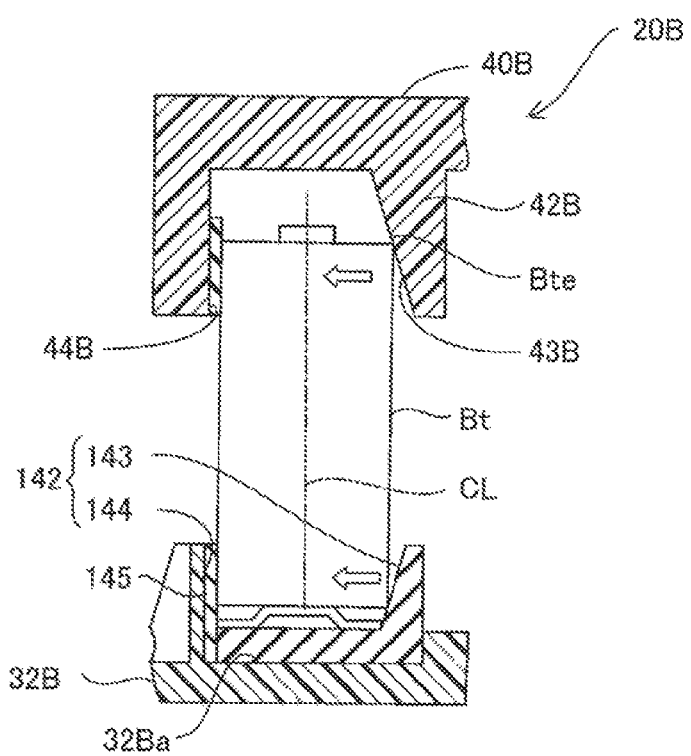
FIG. 11 is a diagram illustrating a battery holder according to a second embodiment, of the invention.
Figure 12:
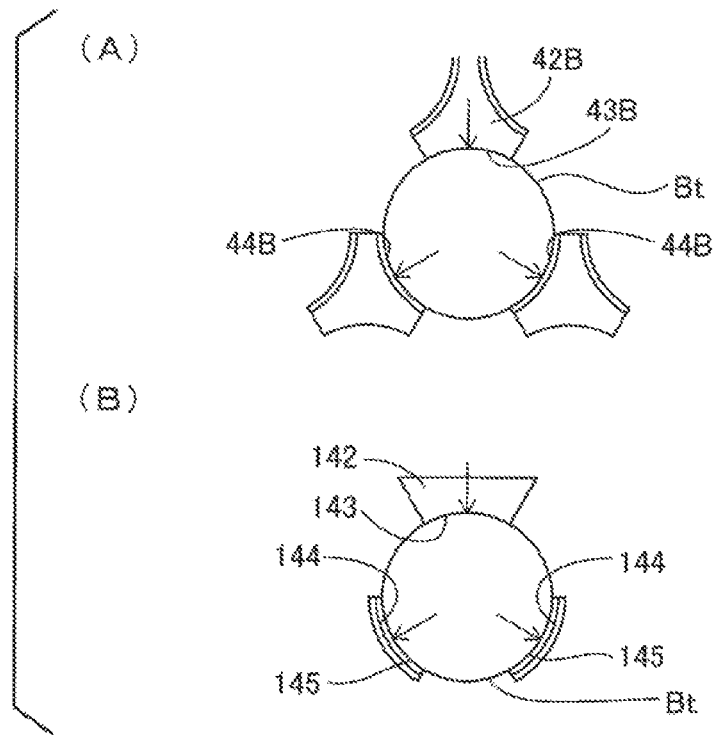
FIG. 12 is overhead views illustrating restriction members.

FIG. 11 is a diagram illustrating a battery holder 20B according to a second embodiment. This embodiment is characterized by the structure where a restriction member 142 is provided to support the outer periphery of the other end face of the battery Bt. FIG. 12 is overhead views of a restriction member 42B and the restriction member 142. FIG. 12(A) shows the upper restriction member 42B and FIG. 12(B) shows the lower restriction member 142. The restriction member 142 is provided in a support recess 32Ba of a bottom plate 32B and includes a tapered surface 143 and two support surfaces 144. A member having the tapered surface 143 is made of an elastic material such as rubber. The tapered surface 143 (FIG. 12(B)) is located on the same side as that of an upper tapered surface 43B (FIG. 12(A)). Members forming the support surfaces 144 shown in FIG. 11 are vertically arranged and protruded at two different positions from the upper surface of the bottom plate 32B made of a hard resin (e.g., PPS), and elastic members 145 are additionally attached to the inner wails of the support surfaces 144. As shown in FIG. 12, the two support surfaces 144, 144 are arranged respectively on the same sides as those of upper support surfaces 44B, 44B.

As shown in FIG. 11, when the restriction member 42B is inserted into the space between the batteries Bt and the tapered surface 43B presses the edge Bte of the battery Bt, the battery Bt is moved in the radial direction. With such motion of the battery Bt, as shown in FIG. 12(A), the upper side face of the battery Bt presses the support surfaces 44B, and the battery Bt is positioned by surface contact with the support surfaces 44B by its reactive force.

As shown in FIG. 11, the lower part of the battery Bt is pressed by the tapered surface 143 and receives the force in the radial direction. This causes the lower side face of the battery Bt to be pressed against the support surfaces 144 and to be positioned by surface contact with the support surfaces 144 as shown in FIG. 12(B). Accordingly the upper side face of the battery Bt is positioned by line contact with the tapered surface 43B, while being positioned by surface contact with the two support surfaces 44B. The lower side face of the battery Bt is positioned by line contact with the tapered surface 143, while being positioned by surface contact with the two support surfaces 144 located on the same sides as those of the support surfaces 44B. The battery Bt is thus effectively positioned on the upper and lower side faces of the battery Bt.

C. Third Embodiment

Figure 13:
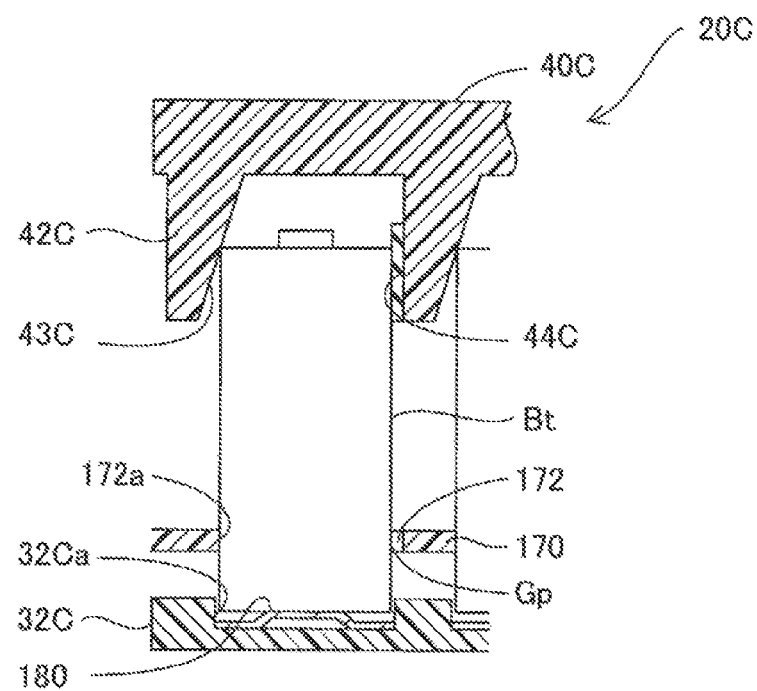
FIG. 13 is a cross sectional view illustrating a battery holder according to a third embodiment of the invention.

FIG. 13 is a cross sectional view illustrating a battery holder 20C according to a third embodiment of the invention. This embodiment is characterized by the structure to additionally support the battery Bt on its center part. A middle support plate 170 is located between restriction members 42C and a bottom plate 32C. The middle support plate 170 has through holes 172, which the batteries Bt pass through. The through hole 172 has a gap Gp from the side face of the battery Bt. The lower part of the battery Bt is held by a support recess 32Ca of the bottom plate 32C. A bus bar 180 is placed in the support recess 32Ca. The bus bar 180 is made of a spring that presses the battery upward in the axial direction. The bus bar 180 is in electrically contact with the negative terminal of the battery.

When the battery Bt receives a tilting force, for example, during insertion operation of the restriction member 42C, the side face of the battery Bt comes into contact with an inner wall 172a of the through hole 172 to limit inclination of the battery Bt. Accordingly the battery Bt is supported on the upper part of the battery Bt by a tapered surface 43C and support surfaces 44C, is supported on the center part of the battery Bt by the inner wall 172a of the through hole 172 and is supported on the lower part of the battery Bt by the support recess 32Ca.

The middle support plate 170 holds the attitude of the battery Bt in a specified position, before the battery Bt is supported by the restriction member 42C, i.e., in the state that the battery Bt is placed on the bottom plate 32C. This facilitates the holding operation of the battery.

Additionally, the bus bar 180 for the negative terminal is made of a spring and absorbs the force in the axial direction of the battery, thus absorbing a variation in dimension in the axial direction of the batteries.

D. Other Embodiments

The present invention is not limited to the embodiments, examples or modifications described above but may be implemented by various other configurations within the scope of the invention.

(1) The above embodiment uses the elastic members 45 made of an elastic material such as rubber as shown in FIG. 4. This is, however, not restrictive, and metal leaf springs may be attached to the support surfaces 44.

(2) The above embodiment describes the structure having a single tapered surface 43 as the structure to support the side face of the battery. This is, however, not restrictive, and the structure may have two tapered surfaces and one support surface. Any other numbers and any other combinations that provide favorable force for supporting batteries may also be available.

(3) The above embodiment describes the columnar-shaped batteries. This is, however, not restrictive and the invention is applicable to batteries in any other shape that do not damage the functions or advantageous effects of the invention, for example, rectangular batteries and button batteries.

(4) The above embodiment describes the configuration that a plurality of batteries are arranged in an equilateral triangle. This is, however, not restrictive and a plurality of batteries may have any of various other configurations: for example, a lattice configuration and a configuration that minimizes the battery space for the purpose of space saving.

What is claimed is:

1. A battery device configured to hold a plurality of batteries, each battery of the plurality of batteries has a first end face and a second end face opposite to the first end face, each battery of the plurality of batteries has a side face, the battery device comprising:
   a holding base plate located parallel to the first and second end faces of the plurality of batteries; and
   a plurality of restriction members protruded from the holding base plate in an axial direction of the plurality of batteries, the plurality of restriction members are located respectively in a plurality of spaces, each space of the plurality of spaces is between adjacent batteries of plurality of batteries, wherein
   each of the plurality of restriction members comprises:
      a tapered surface which is inclined to the axial direction, and the tapered surface is configured to be in line contact with an outer periphery of one of the first and second end faces of a first battery of the adjacent batteries when the each restriction member is located in a space of the plurality of spaces, wherein the space where the each restriction member is located is between the first battery and a second battery of the adjacent batteries, so as to apply a force to move the first battery in a radial direction of the first battery; and
      a support surface which supports, by surface contact, a side face of the second battery of the adjacent batteries, wherein the second battery is not in contact with the tapered surface of the each restriction member between the first battery and the second battery, wherein
   the support surface is configured to receive a moving force in the radial direction of the first battery from the tapered surface and support the side face of the second battery by a reactive force due to the moving force, wherein
   the plurality of restriction members are formed of a hard resin material, or of a metal material coated with an insulating resin, wherein the hard resin material includes polyphenylene sulfide or potting resin,
   in a cross sectional view through the each restriction member between the first battery and the second battery of the adjacent batteries:
      the support surface, which supports the side face of the second battery, is non-inclined to the axial direction of the plurality of batteries,
      the tapered surface, which supports the side face of the first battery, is inclined to the axial direction of the plurality of batteries.

2. The battery device according to claim 1, wherein
   the support surface has an elastic member provided on a surface that is in contact with the second battery, and
   the elastic member is made of a material having a greater displacement than a displacement of the tapered surface when being pressed by the battery.

3. The battery device according to claim 1, wherein
   the side face of each battery of the adjacent batteries is in a cylindrical shape,
   the tapered surface is a curved surface that is in contact with part of the outer periphery of the one of the first and second end faces of the first battery, and
   the support surface is a curved surface that is in contact with part of the side face of the second battery.

4. The battery device according to claim 1, wherein
   the plurality of batteries includes three batteries including the first battery, the second battery, and a third battery,
   the three batteries are the adjacent batteries, the three batteries are arranged in an equilateral triangle, and
   the each restriction member is configured to be located at a center of the equilateral triangle.

5. The battery device according to claim 1, further comprising:
   at least one support member configured to support the one of the first and second end faces of at least one battery of the adjacent batteries wherein the space where the each restriction member is located is between the adjacent batteries, wherein
   the support member is made of a material having elasticity.

6. The battery device according to claim 1, wherein
   the plurality of restriction members includes at least first and second restriction members, the first restriction member is located at the first end face of the first battery, the second restriction member is located at the second end face of the first battery, wherein
   the first restriction member is located at the first end face of the first battery, the second restriction member is located at the second end face of the first battery, the tapered surface of the first restriction member and the tapered surface of the second restriction member are arranged on identical sides of the first battery in the axial direction.

7. The battery device according to claim 6, wherein
the tapered surface of the second restriction member located at the second end face of the first battery is made of a material having a greater displacement than a displacement of the support surface of the first restriction member located at the first end face, when being pressed by the first battery.

8. The battery device according to claim 1, further comprising:
a middle support plate arranged across a predetermined distance from the each restriction member in the axial direction to come into contact with and support the side faces of each of the adjacent batteries.

9. The battery device according to claim 8, wherein
the middle support plate has a through hole, which one battery of the adjacent batteries passes through and which is configured such that the side face of the one battery of the adjacent batteries is in contact with an inner wall of the through hole.

* * * * *